United States Patent [19]

Hilsum et al.

[11] Patent Number: 4,834,500
[45] Date of Patent: May 30, 1989

[54] THERMOCHROMIC LIQUID CRYSTAL DISPLAYS

[75] Inventors: Kerr, Berkshire; Damien G. McDonnell, Worcestershire, all of England

[73] Assignee: The Secretary of State for Defence in Her Britannic Majesty's Government of the United Kingdom of Great Britain and Northern Ireland, London, England

[21] Appl. No.: 16,621

[22] Filed: Feb. 19, 1987

Related U.S. Application Data

[63] Continuation of Ser. No. 627,821, Jul. 5, 1984, abandoned.

[30] Foreign Application Priority Data

Jul. 12, 1983 [GB] United Kingdom ............... 8318863

[51] Int. Cl.⁴ .................................................. G02F 1/13
[52] U.S. Cl. ................... 350/331 T; 350/341; 350/344; 350/348; 350/351
[58] Field of Search ................... 350/331 T, 351, 348, 350/344, 341; 428/1; 340/765

[56] References Cited

U.S. PATENT DOCUMENTS

| | | | |
|---|---|---|---|
| 3,533,399 | 10/1970 | Newton | 350/351 |
| 3,978,580 | 9/1976 | Leupp et al. | 350/344 |
| 4,061,417 | 12/1977 | Katagiri | 350/351 |
| 4,114,990 | 9/1978 | Mash et al. | 350/341 |
| 4,140,016 | 2/1979 | Fergason | 350/351 |
| 4,251,137 | 2/1981 | Knop et al. | 350/348 |
| 4,256,787 | 3/1981 | Shaver et al. | 350/337 |
| 4,388,139 | 6/1983 | Fuller | 350/351 |
| 4,398,805 | 8/1983 | Cole | 350/345 |
| 4,536,059 | 8/1985 | van den Berk | 350/344 |

FOREIGN PATENT DOCUMENTS 0002130 1/1986 Japan .................. 350/344

OTHER PUBLICATIONS

Cheng et al. "The Liquid Crystal Alignment Properties of Photolithographic Gratings", Appl. Phys. Lett.–vol. 35–No. 6–Sep. 1979–pp. 444–446.

Primary Examiner—Stanley D. Miller
Assistant Examiner—Tai Van Duong
Attorney, Agent, or Firm—Stevens, Davis, Miller & Mosher

[57] ABSTRACT

A thermochromic liquid crystal display comprises a layer of short pitch cholesteric liquid crystal material between two walls. An absorber covers the back of the rear wall. At least one wall is surface profiled with a fine grating to align the liquid crystal material. Typically the grating pitch is 0.05 to 12 μm. The profile may be fine on one wall e.g. 0.05 to 12 μm pitch, 0.1 μm depth and coarse e.g. 125 μm pitch groove width 100 μm, depth 10 μm on the other wall. The cholesteric pitch is arranged to give the desired a selective reflection of light whereby the display is observed to change color with temperature. Using thin flexible walls small displays may be cut from large sheets of embossed polyester plastic materials.

8 Claims, 3 Drawing Sheets

THERMOCHROMIC LIQUID CRYSTAL DISPLAYS

This application is a continuation of our prior co-pending application Ser. No. 627,821, filed July 5, 1984 and now abandoned.

This invention relates to thermochromic liquid crystal displays. Such displays use the selective reflection of cholesteric liquid crystal materials. The observed color is dependent on the cholesteric material pitch and usually varies with temperature.

Thermochromic displays have many uses. For example thermometry e.g. digital thermometers; medical applications e.g. diagnoses of vascular disorders; non-destructive testing e.g. of welding flaws; radiation sensors e.g. thermal imaging, etc. For all these applications it is important that the device has: reliability, with high chemical and photo chemical stability and physical toughness; accuracy, with repeatable color calibration; quality of observed colour purity and brightness. Some of these requirements are chemical and can be solved by use of suitable liquid crystal compounds, for example those described in G.B. Nos. 1,556,994, 1,596,012, 1,596,013, 1,596,014, 1,592,161. Other requirements are physical i.e. containing the liquid crystal material where needed.

Most known thermochromic devices contain liquid crystal material on a supporting substrate. An ink is prepared and printed on the substrate. This ink incorporates liquid crystal material in small droplets. Two known methods of preparing the ink use micro-encapsulation, and polymerdispersion.

The technique of micro-encapsulation is disclosed in U.S. Pat. No. 3,585,381. It involves encasing droplets of liquid crystal (diameters 5–50 $\mu$m) in polymer sheets made from one or a combination of the following: a gelatine-gum arabic system, a polyvinyl alcohol-based system, a zein based system or an aminoblast condensate such as resorcinol-formaldehyde. A slurry of these capsules in a water/polymer solution gives the 'ink'.

The technique of polymerdispersion is similar to the above technique with the difference that the dispersed liquid crystal droplets in the binder polymer film are not first pre-coated with a polymer shell. The droplets are located in cavities within a continuous polymer matrix layer. U.S. Pat. Nos. 1,161,039 and 3,872,050 describe two different methods of producing the polymerdispersions.

There are problems with both micro-encapsulation and polymerdispersion. The observed color purity and brightness is low partly because only a part of the liquid crystal material is in the best orientation of cholesteric helices for optimum reflection.

All the above thermochromic devices work by the change in cholesteric pitch with temperature. Due to the helical nature of cholesteric molecular arrangement light is selectively reflected; different pitches reflect different wavelengths, i.e. Bragg reflection. Thus as the pitch changes so does the wavelength, and hence color, of reflected light. The pitch change is due solely to temperature change in the absence of any applied electric field.

This contrasts with many prior art color change devices using unencapsulated layers of liquid crystal material. Such devices use a layer of liquid crystal material between two walls bearing electrodes. Application of an electric field by the electrodes causes a change in the molecular ordering of the liquid crystal material.

For example U.S. Pat. No. 4,251,137 describes a liquid crystal cell in which a layer of nematic liquid crystal material is contained between cell walls. The inner surface of these walls is profiled in a fine rectangular wave pattern, i.e. a light grating. When an electric field is applied across the layer thickness the refractive index of the liquid crystal changes from that of the zero voltage state. Two different colors are observed depending on the voltage ON or OFF state of the liquid crystal material. The wall surface profile determines the observed colors. This device is not thermochromic i.e. does not change color with temperature.

Another color change device is described in U.S. Pat. No. 4,398,805. A dichroic dye is incorporated in a layer of a cholesteric liquid crystal host material. When an electric field is applied across the layer the liquid crystal molecules rotate thereby rotating the dye molecules to an ON-state. The ON-state is observed as a different color to the zero voltage OFF-state. No temperature changes are involved.

The present invention is concerned with thermochromic devices, i.e. those whose cholesteric pitch changes with temperature, and is to be contrasted with those devices requiring electric field induced changes to molecular ordering.

The problem of color purity and low reflectance are solved according to the present invention by containing a layer of short pitch cholesteric liquid crystal material between two surfaces, at least one of which has a surface profile in a fine grating to align the liquid crystal molecules.

According to this invention a thermochromic liquid crystal display device for indicating temperature changes by a change in observed color,
 comprises two thin flexible walls bonded at their edges to contain a layer of cholesteric liquid crystal material; said liquid crystal material having a cholesteric pitch between 0.2 and 0.78 $\mu$m;
 said pitch changing in value with temperature of liquid crystal material thereby selectively reflecting different colors depending upon said temperature; and
 at least one of said walls having a surface profiled as a series of fine grooves and ridges with a groove width of 0.05 to 12 $\mu$m, whereby molecules of said liquid crystal material are aligned by said grooves substantially parallel to said wall.

The walls may be flexible or non-flexible, and thick or thin, and combinations thereof.

The pitch of the cholesteric material is a pitch suitable for selectively reflecting light, e.g. a pitch typically 0.2 $\mu$m to 0.78 $\mu$m or more.

Preferably the layer of liquid crystal material is 10 $\mu$m or more thick e.g. 10–50 $\mu$m.

Both walls may have surface gratings of equal or different pitch and or profile. Alternatively one wall has a grating whilst the other wall is untreated or treated to give homeotropic alignment. Surface gratings may be provided by embossing thin sheets of plastic material. This grating may have a rectangular, or square, saw tooth, triangular, trapezoidal, sine wave, or approximations to these profiles, sufficient to give a closely spaced series of aligning grooves.

The display may operate by reflection in which case the rear wall is covered with an absorbing layer or is formed as an absorbing layer. Alternatively the display may be arranged to operate as a narrow band transmission filter by arranging a plurality of displays optically in series.

An enhanced reflective display may be formed by arranging a half wave plate between two displays, the rear display having an absorbing rear surface.

A memory effect may be built into the display by providing a very strong surface alignment which tends to prevent molecular realignment after a localised heating has been removed. Return to the original condition may then be achieved e.g. by local deformation as by flexing.

Displays may be provided in larger sheets bonded at their edges and spaced apart by spacer pillars formed on embossed sheets of plastic. Alternatively the displays may be of various shapes, large or small, punched out of larger displays; the act of punching being arranged to heat seal the edges.

The particular liquid crystal material used is selected to give the desired colour at a given temperature. This is achieved by mixing materials to give the required pitch and refractive index at a given temperature. Wavelength of reflected light ($\lambda$) is proportional to the average of the refractive indices $(n_o+n_e)/2$, and cholesteric pitch p. Pitch p varies with temperature.

The invention will now be described by way of example only with reference to the accompanying drawings of which:

Figure 1:
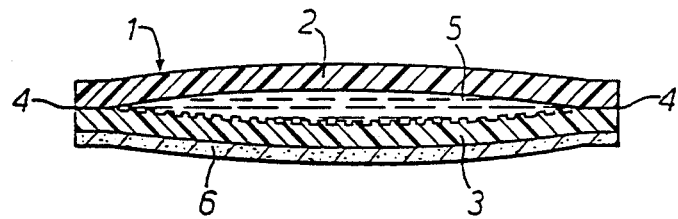
FIG. 1 is a sectional view of a thermochromic liquid crystal display, not drawn to scale.
Figure 2:
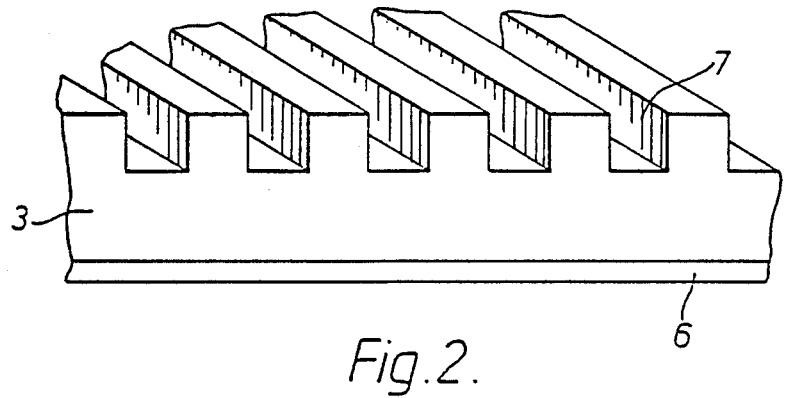
FIG. 2 is an enlarged view of part of one wall of FIG. 1 showing a profiled inner surface.

As shown in FIGS. 1, 2 A thermochromic display cell 1 comprises a thin flexible front wall 2 and a thin flexible rear wall 3 bonded at their edges 4 to enclose a short pitch cholesteric liquid crystal material 5. A black absorbing layer 6 e.g. of Gold Black is formed on the rear of the rear wall 3 or the wall itself formed of a black opaque material e.g. black Melinex. Both walls 2, 3 may be of a 30 $\mu$m thick transparent plastic sheet such as Melinex 301 (I.C.I. material) which is a polyester co-extruded film with an amorphous surface layer which can be embossed. The thickness of this amorphous layer depends upon the size of profile required. For example the layer may be 3 $\mu$m or more thick.

The rear wall 3 of the cell is embossed with a grating 7 shown more clearly in FIG. 2. This grating 7 has a square or rectangular profile, typical groove width is 0.05 to 12 $\mu$m and depth 0.05 to 0.1 $\mu$m. As shown only the rear wall 3 is embossed. The front wall 2 is flat and untreated but may also be embossed and the grating aligned non-parallel to the rear grating. Alternatively the front wall 2 may be treated, e.g. by dipping in lecithin to give a homeotropic alignment.

The cholesteric liquid crystal material 5 is aligned by the grating 7 with the helical axis of the director perpendicular to the walls 2, 3. This results in substantially all the liquid crystal molecules being in the ideal alignment for maximum reflection of a single wavelength.

The liquid crystal material 5 has a pitch, p, which selectively reflects visible light e.g. light between 3,800 and 7,800 Å wavelength. Examples of suitable materials are B.D.H. catalogue numbers TM 74A, TM 74B, TM 75A, and TM 75B. These are mixed to give a color and a temperature range as required. One example is a mixture giving a color play of red-blue over a temperature range of 21°-25.5° C. This is formed of 40% by weight of mixture A+60% by weight of mixture B.

Mixture A=30% weight of TM 74A+70% weight TM 75A

Mixture B=30% weight of TM 74B+70% weight TM 75B

A fine tuning of the range and color may be made by adding small amounts of mixture A, B, TM 74A or TM 75B.

Liquid crystal material is introduced between the walls by spreading a thin layer e.g. 10 $\mu$m thick over the profiled surface of one wall. The other wall is laid over the liquid crystal and the edges sealed e.g. by punching out shapes or pressure and temperature e.g. 100° C. where required.

Suitable materials for mixing are:

| CHIRAL NEMATIC LIQUID CRYSTALS | |
|---|---|
| CB15 | 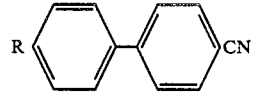 |
| CEI |  |
| CE2 | 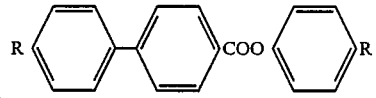 |
| CE3 | 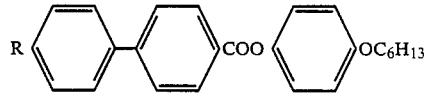 |
| CE4 | 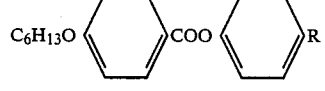 |
| CE5 | 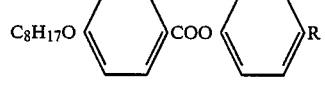 |
| CE6 | 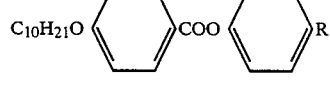 |

-continued

CHIRAL NEMATIC LIQUID CRYSTALS

CE7

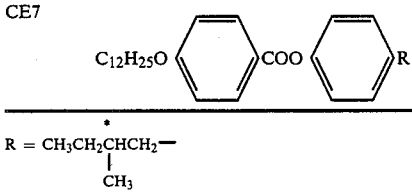

R = CH₃CH₂CHCH₂—
         |
         CH₃

| BDH NAME | mpt °C. | S-Ch °C. | Ch-I °C. | Pitch* (μm) |
|---|---|---|---|---|
| CB15 | 4 | (<−30) | (−30) | 0.15 |
| CE1 | 99.5 | — | 195.9 | 0.15 |
| CE2 | 103.0 | — | 115.5 | 0.10 |
| CE3 | 68.8 | 80.2 | 163.5 | 0.23 |
| CE4 | 38 | — | (36.7) | 0.23 |
| CE5 | 47.5 | — | (42.0) | 0.23 |
| CE6 | 41.8 | 42.2 | 45.3 | 0.23 |
| CE7 | 45.4 | 47.8 | 48.0 | 0.23 |

The grating 7 may be formed on the Melinex (I.C.I.) by embossing. A copper plate or roller is coated on a surface with a nickel plating. This plating is then selectively removed using standard photolithographic techniques to give a square or rectangular profile. Typically the grooves are 0.05 to 12 μm wide and 0.05–12 μm deep. The nickel layer is coated with a thin, less than 1 μm, layer of a release agent such as Fluorad Surfectant FC 721. The plate or roller is heated to about 105°–115° C. and pressed onto the amorphous surface layer of the Melinex 301 sheet. A typical pressure is 3–5 atmospheres. This forms a fine grating on the Melinex 301.

In operation white light is incident on the front wall of the cell. Colored light e.g. red of one sense of circular polarisation is reflected back to an observer 8. The same red colored light of the opposite sense of circular polarisation is transmitted through both walls 2, 3 of the well to be absorbed by the absorbing layer 6. Other wavelengths of light pass through the cell 1 and are absorbed by the absorber 6.

The actual colour of reflected light is governed by the cholesteric pitch and refractive index, n wavelength = np.

As the temperature of the cholesteric changes pitch p changes and a different color is observed. The amount and small range of frequencies reflected, ie. color purity, is enhanced by the accurate alignment of the cholesteric axis over the whole display.

Figure 3:
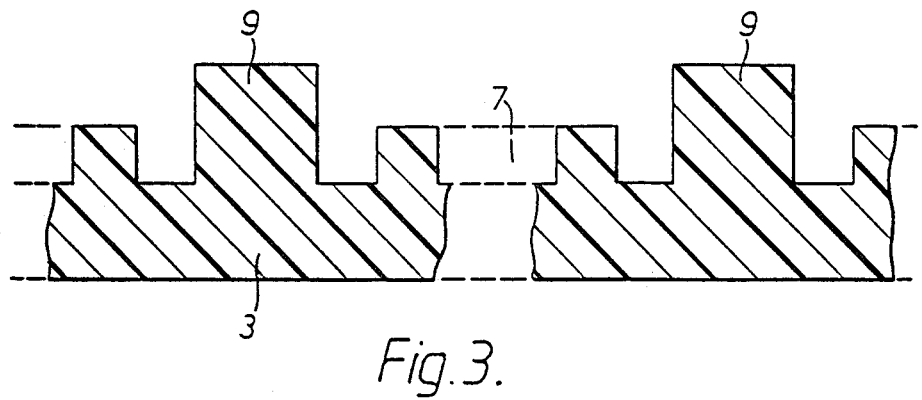
FIG. 3 is a sectional view of an alternative wall, useful in larger displays.

FIG. 3 shows the surface profile of a cell 1 wall for use in larger displays. The wall 3 is embossed to give both a grating 7, as in FIG. 2, and pillars 9. These pillars help give a reasonably uniform thickness to the complete cell 1. Typically the pillars are of square section 25 μm×25 μm, 25 μm, 25 μm high, and spaced 250–300 μm apart. Two sections of embossed Melinex may be brought into contact and quickly heated to fuse the pillars of one sheet onto the adjacent sheet.

The cell walls 2, 3 may also be formed by thicker sheets of material, e.g. glass but in these cases the temperature changes are slower and the cell is not so flexible.

Figure 4:
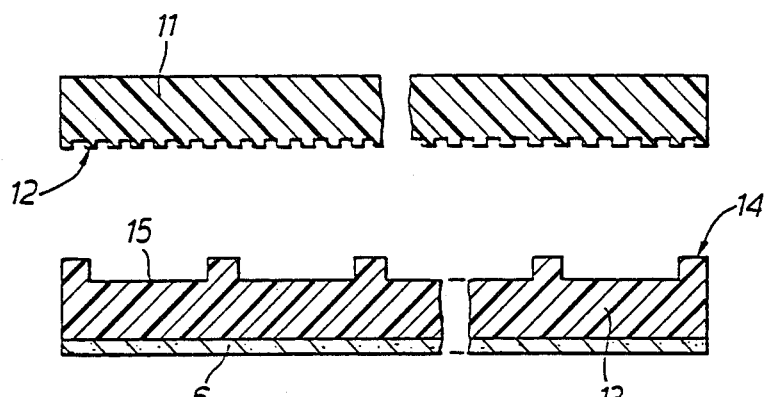
FIG. 4 is a sectional view of an alternative display showing the two walls only.
Figure 5:
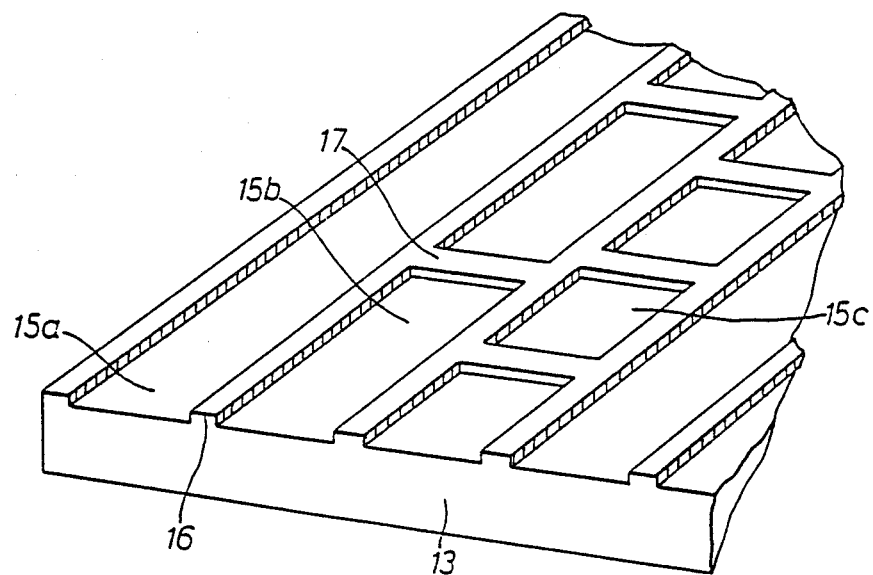
FIG. 5 is a perspective view of one wall of the display of FIG. 4.

An alternative arrangement of display is shown in FIGS. 4 and 5. A thin front wall 11 is embossed on its inner surface with a fine grating 16. For example a grating of square or sine wave profile with a pitch less than 5 μm e.g. a groove width of less than 2.5 μm, and with a groove depth of less than 0.1 μm.

The rear wall 13 is embossed with a coarse profile 14. For example a groove 15 width of 100 μm, a groove depth of 10 μm to 50 μm, with a gap or web 16 between grooves of 25 μm. The grooves in the front and rear walls may be arranged parallel or non-parallel e.g. orthogonal to one another. An absorber 6 covers the rear of the rear wall.

As seen in FIG. 5 the coarse grating may have grooves 15a extending the whole length of a sheet. Alternatively the grooves may have cross webs 17 to form elongated 15b or square 15c depressions in the wall 13 surface. These depressions may have rounded corners, and may be oval or even circular in plan.

To form a display cell liquid crystal material is spread over a large sheet 13 having the coarse grating e.g. by silk screen printing, a roller, ink jet printing, or spraying to a depth of about 10 μm. The front wall 11, in the form of a large sheet, is placed over the rear wall 13 and the two pressed together with an amount of heating e.g. to 100° C. to seal the webs against the front wall. When the coarse grating has cross webs 17 the result is a plurality of closed cells. The complete display may then be cut with a knife or scissors into different shapes.

Different compositions of liquid crystal material, may be printed in different areas of the rear wall. These different compositions may be separated by areas of non-liquid crystal material or be left empty.

The bottom of the groove 15 of the coarse grating may have superimposed thereon a fine grating. Alternatively the grooves may have homeotropic or homogeneous surface alignment treatment.

A memory effect may be provided by varying the profile of the grating 7. For example decreasing the depth and/or spacing of the grooves to reduce the aligning of liquid crystal molecules. Thus a change in molecular ordering caused by local heating is retained on cooling. Local deformation is needed to cause the display to return to its original state.

One use for the display of this invention is for a thermal imaging system retina onto which an image of a thermal scene is focussed. A large number of very small display discs are mounted on a thin support of low lateral thermal conductivity. This separation of discs provides a reticulation and reduces lateral spread of the thermal image. Temperature variations across the retina are observed as different colors representing the thermal scene.

Figure 6:
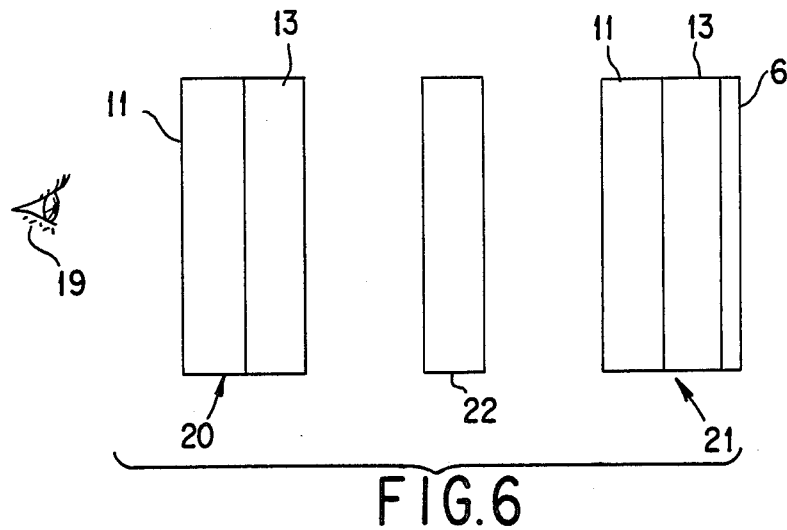
FIG. 6 is an exploded view of an enhanced color display.

FIG. 6 shows an enhanced reflective array formed by a front and a rear display 20, 21 with a half wave plate 22 arranged between them. The rear display 21 is formed of the display of FIG. 4 and is given like reference numerals. The front display is similar but omits the rear absorber 6. A color display is observed at 19. The components are shown as separated for ease of understanding but in practice will be held together as a single unit.

Figure 7:
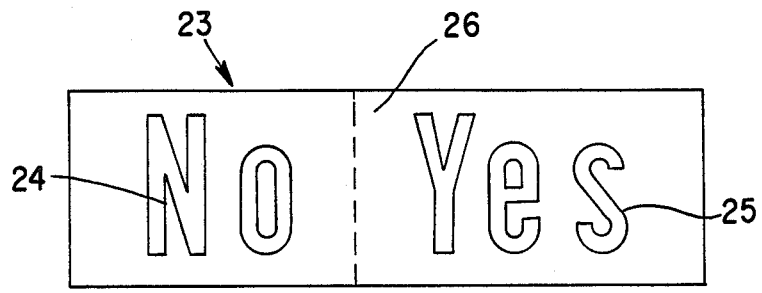
FIG. 7 is a front view of a display using different colors in different parts of the display.

FIG. 7 shows a display 23 having a construction shown in FIG. 5. This has two areas 24, 25 of different compositions of liquid crystal indicating different messages. The area 26 between them may be left empty or filled with a liquid crystal of yet another composition.

We claim:

1. A thermochromic liquid crystal display device for indicating temperature changes by a change in observed color, said device comprising two thin flexible walls bonded at their edges to contain a layer of cholesteric liquid crystal material;

said liquid crystal material having a cholesteric pitch between 0.2 and 0.78 $\mu$m;

said pitch changing in value with temperature of liquid crystal material in the absence of any electrical excitation thereby selectively reflecting different colors depending upon said temperature; and at least one of said walls having a surface profiled as a series of fine grooves and ridges with a groove width of 0.05 to 12 $\mu$m, whereby molecules of said liquid crystal material are homogeneously aligned by said grooves substantially parallel to said wall.

2. The display device of claim 1 wherein only one wall is shaped with said fine grooves and ridges to a give a homogeneous alignment to liquid crystal material in contact therewith, and the other wall is treated to give a homeotropic alignment of liquid crystal material in contact therewith.

3. The display of claim 1 wherein the shape of grooves and ridges on the surface of one wall is different from the shape of the grooves and ridges on the other wall.

4. The display of claim 1 wherein the surface of one wall is shaped with a series of spacing pillars or ridges to provide a uniform spacing apart of both walls, said spacing pillars or ridges being spaced 100 $\mu$m or more apart.

5. The display of claim 4 wherein said spacing ridges are provided with cross webs whereby the liquid crystal material is contained within a plurality of closed cells.

6. The display of claim 1 and comprising further a light absorber arranged at the rear of the display.

7. A display device combination comprising two display devices constructed according to claim 1, a half wave plate in a light path between said two devices, and a light absorber arranged at the rear of said path.

8. The display device of claim 1 wherein different areas of the display contain different compositions of cholesteric liquid crystal material.

* * * * *